W. J. RAY.
JOURNAL BOX.
APPLICATION FILED JUNE 10, 1916.
1,200,759.
Patented Oct. 10, 1916.
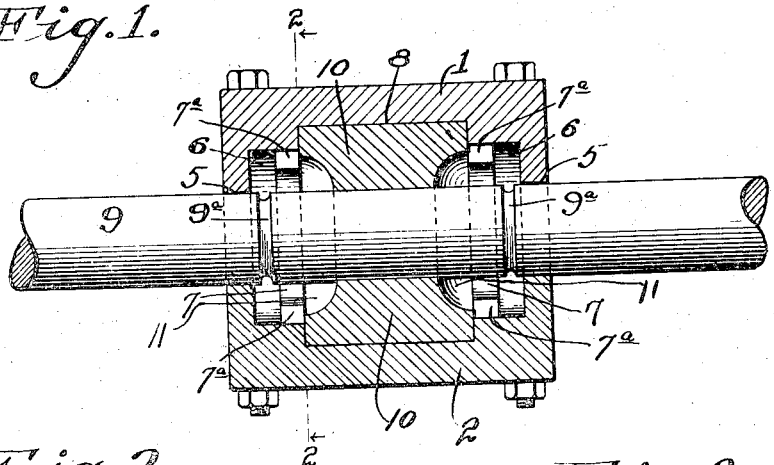
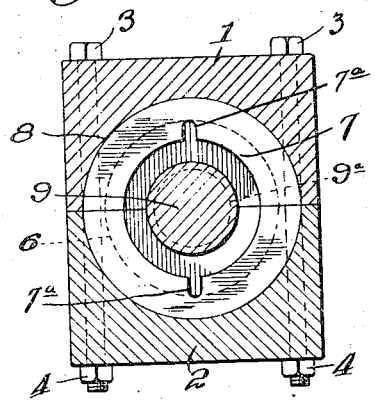
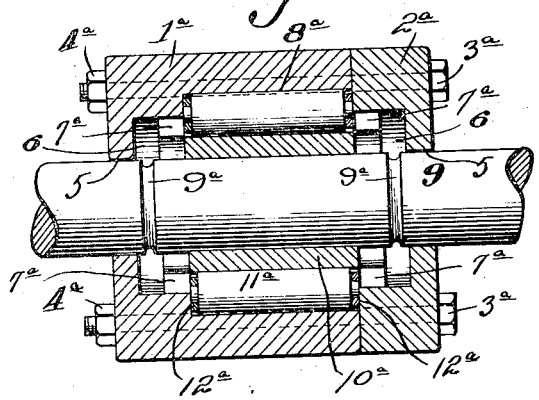
WITNESSES
Rolando Williams.
N. H. Babcock.
INVENTOR
William J. Ray
BY Richard B. Owen,
ATTORNEY

UNITED STATES PATENT OFFICE.

WILLIAM J. RAY, OF FORT SMITH, ARKANSAS.

JOURNAL-BOX.

1,200,759.　　　Specification of Letters Patent.　　Patented Oct. 10, 1916.

Application filed June 10, 1916. Serial No. 102,951.

*To all whom it may concern:*

Be it known that I, WILLIAM J. RAY, a citizen of the United States, residing at Fort Smith, in the county of Sebastian and State of Arkansas, have invented certain new and useful Improvements in Journal-Boxes, of which the following is a specification.

This invention relates to journal boxes, and more particularly to boxes so constructed that the journal or bearing member rotates at all times in an oil bath.

One of the main objects of the invention is to provide a box of the character stated of simple construction and operation.

A further object is to provide a box so arranged that the oil flows from each end toward the center so as to keep the bearing members submerged in an oil bath.

In the drawings Figure 1 is a central vertical longitudinal view through the box, Fig. 2 is a section on line 2—2 of Fig. 1, Fig. 3 is a view similar to Fig. 1 of a modified form of the invention, and Fig. 4 is a similar view of another modified form.

The box is composed of an upper section 1 and a lower section 2 secured together by bolts 3 and nuts 4. Each of these sections is provided, at its end, with a semi-circular opening 5. An annular recess 6 is formed concentric with opening 5 and an inwardly projecting annular flange 7 is provided adjacent the inner end of recess 6. This flange is of such width as to leave an opening of greater diameter than opening 5 and concentric therewith. Each of the sections of the box is further provided, at its central portion, with an annular semicircular recess 8 of greater diameter than the recess 6. When the two members 1 and 2 are secured together the journal box is provided having in its interior two annular recesses 6, two annular inwardly projecting flanges 7 inclosing circular openings concentric with and greater than the openings through the ends of the box, and a central annular recess 8 of greater diameter than the recesses 6.

A shaft 9 is inserted through the openings 5 in the end of the box and is provided with a heavy bearing ring 10 secured thereon. This ring fits snugly within the recess 8 and is provided, in each side face, with an inwardly directed channel 11 concentric with shaft 9. This channel is of approximately quadrantal cross section and extends outward from the periphery of the shaft.

Each of the flanges 7 is provided, at the top and bottom thereof, with a recess or notch 7ª which extends outwardly to the periphery of recess 6. By this means direct communication between the channels 11 and recesses 6 is established at the top and bottom of the flanges 7.

In applying my invention, the lower section 2 of the box is fitted around the shaft and a sufficient quantity of oil is poured into the same. The upper section 1 is then secured in position about the bearing ring 10, as shown in Figs. 1 and 2. As the shaft 9 is rotated, the bearing ring 10 is also rotated. The oil in the lower part of the casing tends, by gravity, to run into the recess 8 surrounding ring 10, through the lower notches 7ª of flanges 7. A certain amount of this oil will flow into the recess so that the lower portion of the ring will be immersed in an oil bath. This insures proper lubrication of the bearing at all times. By far the greater part of the oil will be retained in the lower part of the recesses 6 and, as the bearing ring 10 rotates this oil will be lifted by the same and will act to lubricate the ends of the ring and the inner faces of the flanges 7, thus effectually preventing friction between these surfaces. Any excess of oil will, as the ring 10 is rotated upwardly, flow into the channels 11 and about the shaft 1 and, from the channels into the recesses 6 by means of the notches 7ª. A certain amount of oil will also, as the end face of the ring passes across the upper notch 7ª, flow through this upper notch and down the outer face of flange 7 into the lower portion of recess 6, returning to the bearing ring 10 by means of the lower notch 7ª.

By having the central openings of flanges 7 of greater diameter than the openings 5 at the end of the box, the flanges 7 are of less height than the flanges surrounding openings 5. By this arrangement, and by providing the channels 11 and notches 7ª through the flanges so as to facilitate easy circulation of the lubricant in the interior of the box, all danger of the oil working outward along the shaft is eliminated. The outward curve of the channel 11 away from the periphery of the shaft 9 is of especial importance in accomplishing this end. As the bearing 10 rotates the oil, by gravity and, also, by centrifugal action, works outward away from the shaft and flows into the recesses 6, as previously described.

The shaft 9 is provided, adjacent the downwardly projecting flanges at the outer end of the journal box and within the recesses 6, with two annular grooves 9ª. Any oil which tends to work along the shaft will flow into these grooves and drip from the same into the recesses 6, being returned to the bearing ring 10 through the notches 7ª of the flanges 7. The provision of these grooves materially assist in preventing escape of the lubricant from the journal box.

In Fig. 3 I have shown a modified form of my invention. In this form the casing is composed of a body 1ª and a cap 2ª secured thereto by bolts 3ª and nuts 4ª. Instead of using the large bearing ring 10 I have substituted a lighter ring 10ª and have mounted bearing rollers 11ª in the recess 8ª. These rollers are supported in rings 12ª which fit into the recess 8ª, in the usual manner. This box is applied by removing the cap 2ª and fitting the body 1ª into position over the shaft and the bearing ring, after which the cap is secured on the box as shown in Fig. 3. This box operates in the same manner as that shown in Figs. 1 and 2.

In Fig. 4 I construct the box similarly to that shown in Fig. 3 but, instead of the bearing rollers 11ª I provide bearing balls 11ᵇ mounted in raceways formed in the bearing ring 10ᵇ, and the collar 12ᵇ mounted in recess 8ᵇ. This box also operates in the same manner as that shown in Figs. 1 and 2 of the drawings.

The box shown in Figs. 3 and 4, may, of course, be provided with a suitable bore or oil duct to permit oil to be injected into the box after the same has been assembled.

It will be evident that there can be certain variations made in the type of box used, and in the arrangement and disposition of the various parts of my invention, and I intend to include all such variations as fall within the appended claims in this application, in which a preferred form only of the invention is disclosed.

What I claim, is:

1. In a device of the character described, the combination of a box having a central annular recess, a centrally apertured bearing member mounted in said recess and provided, in its end faces, with annular channels concentric with said aperture, and notched flange members integral with said box and positioned adjacent the end faces of the bearing member.

2. In a device of the character described, the combination of a box provided with a central annular recess and annular recesses adjacent the ends of the said central recess, a bearing member rotatable in said central recess, and notched annular flanges intermediate the central recess and the said two annular recesses and concentric therewith.

3. In a device of the character described, the combination of a box having a central annular recess and annular end recesses of smaller diameter than, and concentric with, the central recess, a bearing member rotatable in the central recess, a shaft secured through said bearing member, the bearing member being provided with channels in its end faces concentric with and adjacent the periphery of the shaft, and inwardly projecting annular flanges intermediate the said central recess and the end recesses, said flanges being provided with top and bottom notches extending to the periphery of the end recesses and with a central opening of greater diameter than the shaft.

4. In a device of the character described, the combination of a box having a central annular recess and annular end recesses of smaller diameter than, and concentric with, the central recess, a bearing member rotatable in the central recess, a shaft secured through said bearing member and provided with annular grooves adjacent the ends of the box, the said bearing member being provided with channels in its end face concentric with and adjacent the periphery of the shaft, and inwardly projecting annular flanges intermediate the said central-recess and the end recesses provided with top and bottom notches extending to the periphery of the end recesses.

In testimony whereof I affix my signature in presence of two witnesses.

WILLIAM J. RAY.

Witnesses:
M. E. JONES,
H. H. BABCOCK.